June 29, 1943.　　　O. W. JOHNSON　　　2,323,137
FRUIT PITTER
Filed June 27, 1938　　　3 Sheets-Sheet 1
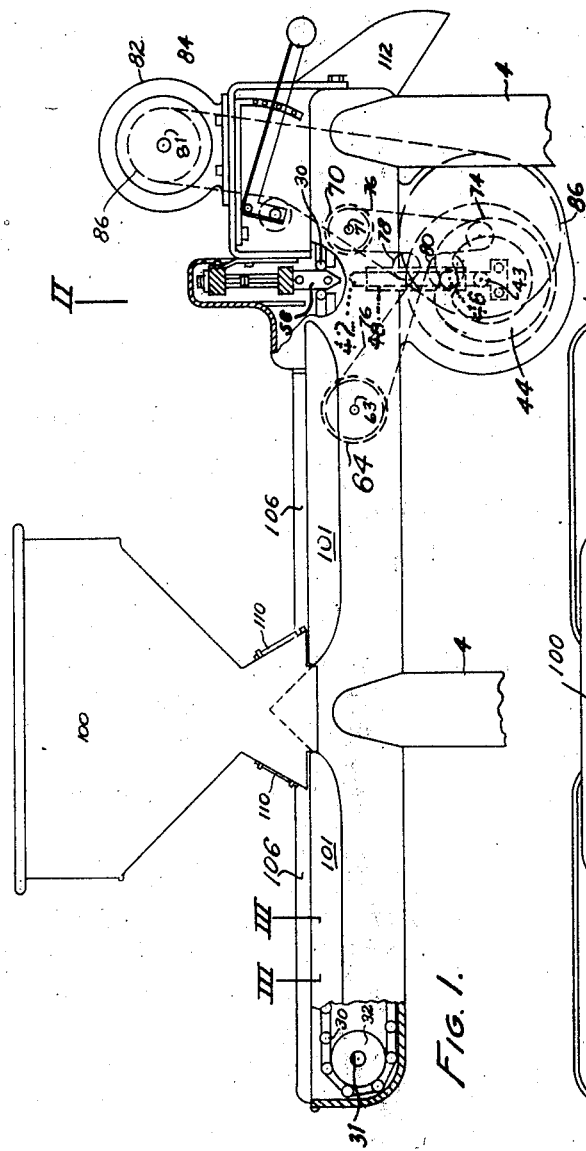
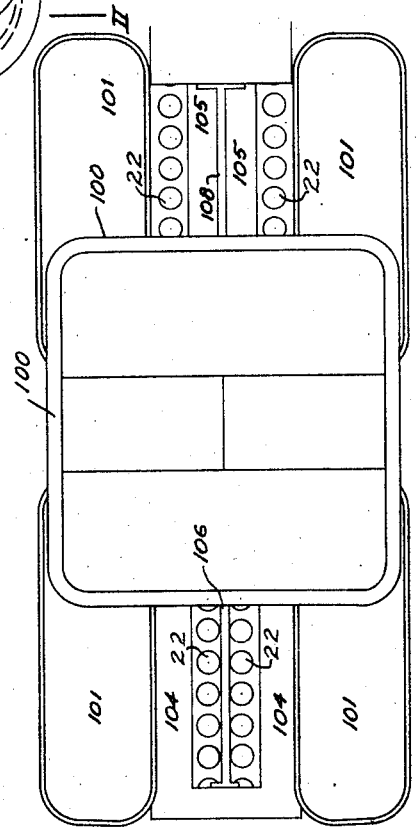
OTTO WILLIAM JOHNSON
INVENTOR.
ATTORNEY.

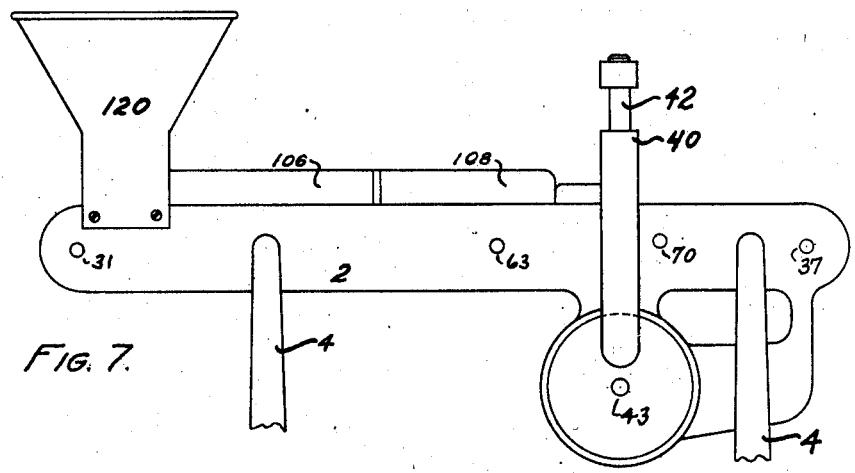
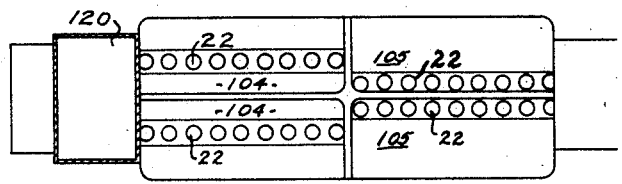
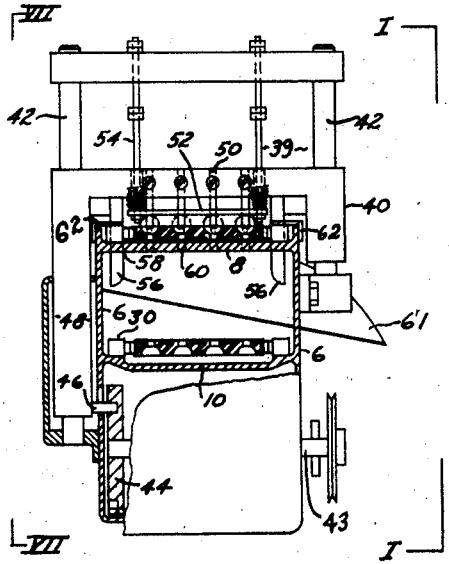

June 29, 1943.  O. W. JOHNSON  2,323,137
FRUIT PITTER
Filed June 27, 1938  3 Sheets-Sheet 3
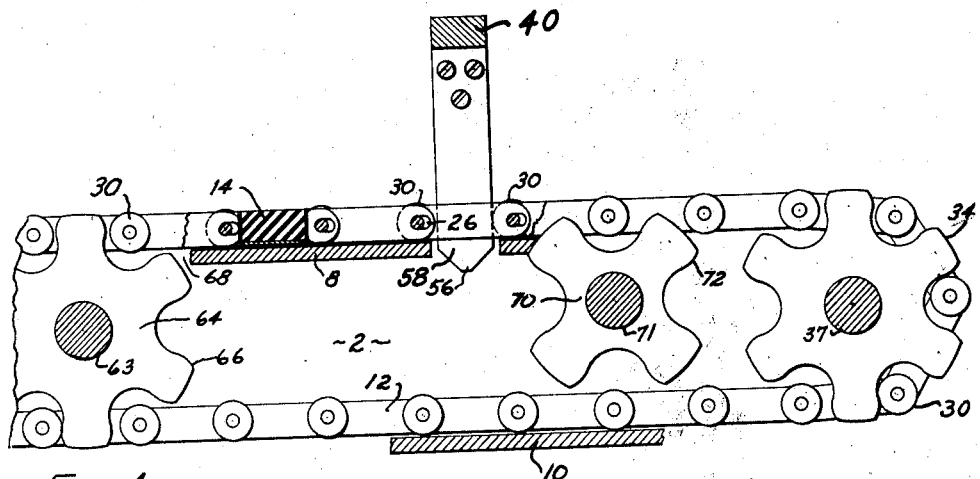
FIG. 4.
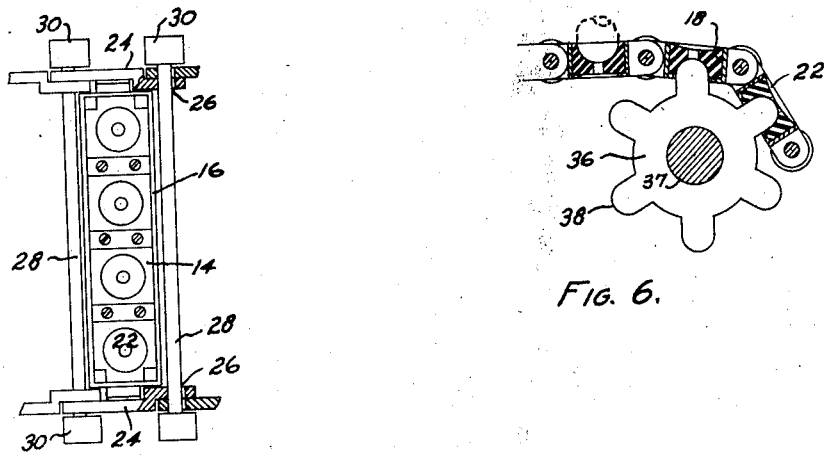
FIG. 3.
FIG. 6.
OTTO WILLIAM JOHNSON
INVENTOR.
ATTORNEY.

Patented June 29, 1943

2,323,137

UNITED STATES PATENT OFFICE 2,323,137

FRUIT PITTER

Otto William Johnson, Oakland, Calif.

Application June 27, 1938, Serial No. 216,049

16 Claims. (Cl. 146—19)

This invention relates to fruit pitting machines and more particularly to a machine for removing the pits from cherries and the like.

It is an object of this invention to provide a simplified machine as compared to other machines of this character, with improved principles of operation whereby high speed of performance in the operation of removing the pits from cherries is attained.

It is another object of this invention to provide a machine which is capable of receiving cherries at a uniform rate and which further provides facilities for feeding cherries thereto by two or more operators stationed on either side of the machine whereby the production is multiplied without unduly increasing the amount of space required over a single operator machine.

Machines of this general character desirably provide for continuous feeding of the fruit to the machine by an operator and to do this in an efficient manner it is desirable to provide a carrier for the reception of the fruit which moves at a continuous and substantially constant rate of speed.

In order to pit fruit, it is further necessary that there be no relative transverse movement of the fruit and the pitter blade during the pitting operation. Some known machines of this character provide a mechanism whereby the pitter mechanism travels with the fruit during the pitting operation. Such machines require moving parts which it is an object of this invention to eliminate, it being proposed to provide for reciprocation of a pitting blade only transversely of the path of the fruit through the machine, and to momentarily arrest only the portion of the carrier which is in the pitting position for only the time necessary to the completion of the pitting and withdrawal stroke by the reciprocating pitting members.

Other objects of the invention will appear from a consideration of the following specification, reference being had to the accompanying drawings wherein:

Fig. 1 is a side elevational view of a preferred embodiment of the invention, portions being broken away and shown in section, and the view being taken as from the line 1—1 of Fig. 2;

Fig. 2 is a sectional elevation taken at the line 2—2 of Fig. 1;

Fig. 3 is a fragmentary plan view of a portion of the fruit carrier as viewed from the direction 3—3 of Fig. 1;

Fig. 4 is a fragmentary view in side elevation showing the relationship of the fruit holders, their driving means, and the fruit holder arresting means during the stroke of the pitting blade;

Fig. 5 is a fragmentary plan view of a portion of the machine of Fig. 1 employing four rows of fruit cups and showing the manner of distribution to a foursome of operators' positions;

Fig. 6 is a fragmentary and partially in section view of a part of the fruit ejector mechanism of the machine;

Fig. 7 is a side elevational view of the machine taken from line 7—7 of Fig. 2, substituting a slightly modified hopper providing for automatic feed to the carrier and dispensing with trays alongside of the carrier; and Fig. 8 is a fragmentary plan view of the machine of Fig. 7 with the mouth of the hopper removed.

In the preferred embodiment of the invention illustrated, a frame 2 is supported by legs 4. The elongate frame member 2 may be generally rectangularly hollow, providing vertical side walls 6 and upper and lower carrier ways 8 and 10, on the upper surfaces of which ways travel the upper and lower reaches of a continuously and uniformly movable carrier 12 comprising a chain-like series of fruit holding members 14, each member comprising a frame 16 in which there is secured a fruit pocket forming member 18 of rubber or the like, said member providing a set of pockets 22 the bottoms of which are of comparatively thin rubber and are perforated for the passage therethrough of fruit pits, the perforations being sufficiently small to strip the flesh of the fruit from the pit as the pit is forced through the opening.

Each frame comprises a pair of end members 24 which are extended beyond the sides of the frame and provided with elongated openings 26 at their opposite ends. The end members of adjacent fruit holder frames are pivoted together by transverse shafts 28, as shown in Figs. 3 and 4, and shafts 28 are provided at their ends with free running rollers 30.

Rollers 30 are of a diameter sufficiently greater than the thickness of the frames to carry the frames on the ways in a wheeled manner.

As shown in the drawings the leftward end of the carrier is trained over a pair of adjustable circular plates 32 placed at either side of the frame in a position in the path of the rollers 30. The opposite end of the carrier is trained over pivotally fixed free running gears 34, the shaft for which carries a set of ejector members 36 having pojections 38 disposed for engagement with the bottoms of the pockets 22 to eject fruit therefrom. Gears 34 mesh with the rollers 30 and the ejectors are therefore actuated by the carrier.

A pit removing mechanism 39 is provided having a reciprocating head 40 slidably supported for rectilinear reciprocation in a vertical direction on rigid guide members 42 suitably secured to the frame member. Head 40 is driven by a box cam 44 with a ninety degree dwell corresponding to the holder arresting, pitting and stripping phases of its movement and the remainder of the cam surface corresponding to the forward movement of the next frame as will be clear from the drawing. The follower 46 carried by sleeve 48 connected to head 40 serves to actuate the head.

Rigidly secured to the head 40 is a pair of fruit holder arresting members 56 disposed for entry between the forward and rearward rollers 30 identified with each holder frame whereby to accurately position the fruit pockets in alignment with the path of movement of the pitter blades 50. A portion of the way 8 is removed as at 58, to permit passage of members 56, and openings 60 are provided for the passage of pits therethrough, a suitable chute 61 being provided for the discharge of the pits beyond the machine.

Angle bars 62 overlying the rollers confine the rollers to a rectilinear path. Adjacent the pitting station, a driving sprocket gear 64 is provided, the same having teeth 66 to engage with the rollers 30, suitable openings 68 being provided in the way 8 to permit the gear 64 to engage the rollers in the upper reach of the chain. The cam 44, the position of the sprocket 64, the number of frames 14, the length of members 56, and the speed ratios of the gearing, is such and so related that sufficient lost motion between the frames is present in openings 26 to permit the required stoppage of the frames for pitting successively.

A second or take-up sprocket 70 is disposed adjacent the discharge side of the pitter mechanism, the teeth 72 of which are so related to the rollers 30 as to permit the required amount of lost motion between the rollers and teeth to allow for the pitting operation, whereupon the take-up sprocket removes the frame from pitting position to the discharge side.

Sprocket gears 64 and 70 are driven from a sprocket pinion 74 by a chain 76, a pair of adjustable idler pinions 78 and 80 being provided whereby to adjust the relative angular positions of the sprocket gears with respect to each other and with respect to the cam 44.

The machine is driven by an electric motor 82, belt 84, and pulley 86, suitable means being provided to vary the speed of the pulley.

As shown in Figs. 1 and 5, the arrangement may provide for concurrently operating with four rows of pockets 22, each frame 14 being provided with four pockets. This arrangement provides a central hopper 100 disposed at a point between the pitter mechanism and the leftward end of the carrier. Four trays 101 are disposed so that two operators are positioned at each side of the machine as shown.

Only the central two rows of pockets are exposed adjacent the leftward trays, cover plates 104 screening the other two rows. Only the outer two rows are exposed to access by the operators positioned at the rightward trays, the inward rows being screened by plates 105. Barriers 106 and 108 placed between operators confine vision to the assigned row. A gate 110 is associated with the hopper for each tray.

In the operation of the machine of Fig. 1, with the carrier in motion, the operator places the cherries in the pockets with the stem end in the desired position. As each frame arrives opposite the pitter blades, members 56 enter between the rollers 30 and fix the position of the cherries in line with the blades. The pitter head continuing downward forces the blades through the cherries, removing the pits and forcing them through the pocket bottoms. The pitter head then moves upwardly, releasing the frame, whereupon the take-up sprocket pulls that frame away and positions the next frame in line with the blades, and so on.

After pitting the cherries may be sliced, this operation preferably taking place as the cherries are ejected from the pockets by ejectors 36 which eject the fruit onto a chute 112 or the like.

In Fig. 7 an automatic hopper 120 is provided, the fruit being fed to the pockets automatically and there positioned by the operator, thus eliminating an operation manually. The pockets are screened and no operators' trays need be provided.

Having described my invention, and explained the principle thereof in connection with a preferred embodiment, it will be obvious that various modifications thereof may be resorted to. Therefore, I desire to be limited only to the invention as defined by the claims.

What is claimed is:

1. A fruit pitting machine comprising in combination, a reciprocatory pitter head, means for driving said head in a rectilinear path, a fruit holding device for holding fruit during operation thereon by said pitter head, a carrier for said fruit holding device, means for driving said carrier at a constant speed with respect to said rectilinear path, and means for arresting said fruit holding device in the rectilinear path of said reciprocating pitter head.

2. In a fruit pitting machine, a reciprocating pitter head, means for reciprocating said head in a rectilinear path, a fruit holder for positioning and holding the fruit to be pitted in the path of the pitter head, a carrier for said fruit holder, means positioning said carrier for movement transversely of the path of said pitter head, constant speed means for continuously driving said carrier, and means for arresting said fruit holder in the path of said reciprocating head.

3. In a fruit pitting machine, a reciprocating pitter head, means for reciprocating said head in a rectilinear path, a fruit holder for positioning and resiliently holding fruit in the path of said pitter head for pitting of the fruit, means for moving said fruit holder into position in the path of said pitter head for pitting of fruit, means for driving said moving means at a continuously uniform rate, and means for arresting said fruit holder in the path of the pitter head during the pitting operation.

4. In a fruit pitting machine, uni-directionally movable means for feeding fruit to a pitting position at a continuous and constant rate, means for arresting the fruit at said pitting position during a pitting operation, and means movable transversely of the path of movement of said fruit for removing pits therefrom.

5. In a fruit pitting machine, a carrier for receiving fruit to be pitted, means for driving said carrier at a continuous and constant rate, means on said carrier forming pockets for the reception of fruit to be pitted, means comprising a pitter head disposed adjacent said carrier and reciprocable in a fixed path with respect to said carrier to cooperate with said carrier and pockets to remove pits from fruit positioned therein, and means for arresting the movement of said pocket forming means during the pitting operation.

6. In a fruit pitting machine, a carrier comprising fruit receiving pockets for receiving fruit in proper position for subsequent pitting, means for driving said carrier at a constant and continuous rate in a fixed path, means for arresting a part of said carrier at a fixed part of its path, means for operating on the fruit on said part of said carrier for removing a pit therefrom while said part of said carrier is arrested, and means for causing said carrier part to thereafter assume the same speed as the remainder of the carrier.

7. In a fruit pitting machine, a chain-like carrier comprising a series of interlinked members, pockets carried by said members, means for forcing pits from fruit in said pockets through the bottoms of the pockets, and means for subsequently engaging the bottoms of the pockets to deform the pockets and thereby remove the fruit therefrom.

8. In a fruit pitting machine, an elongated chain-like carrier comprising a series of interlinked fruit holding members, means providing lost motion between adjacent members, means defining a pitting position, means for driving said carrier at a continuously uniform rate toward said pitting position, means for arresting said members successively at the pitting position, means for removing pits from fruit in said position, and means for removing said arrested members from said pitting position after removal of pits from the fruit on said members.

9. In a fruit pitting machine, an elongated chain-like carrier comprising a series of interlinked fruit holding members, means providing lost motion between adjacent members, means defining a fruit pitting position for said members, means adjacent said position for pulling said members to said position and releasing said members for stoppage at said position, means for removing the pits from fruit on said members while in said position, means for centering said members while in said position and during the pitting operation, and means for ejecting the fruit from said members after the pitting operation.

10. In a fruit pitting machine, an elongated carrier comprising a series of sets of fruit receiving pockets arranged in side by side relationship with respect to the direction of movement of said carrier, means for driving said carrier at a continuously uniform rate, a rectilinearly reciprocative pitter head disposed adjacent said carrier comprising a set of pitter blades disposed for cooperation with said sets of pockets, a fruit distributing hopper adjacent said carrier, and an elongated tray disposed at each side of said carrier adjacent its path of movement for ready access by each of a plurality of operators positioned at said sides for placing fruit in one of said pockets of said pairs respectively.

11. In a fruit pitting machine, a horizontally disposed frame member providing a channel-like carrier way, a chain-like carrier comprising a series of linked fruit holding members, pivot pins joining said fruit holding members, rollers carried by said pins and disposed for rolling engagement with said frame member, means for engaging said rollers for driving said carrier at a continuously uniform rate, means movable transversely of the path of movement of said carrier for engaging said rollers to arrest the movement of individual ones of said holding members, means for removing pits from fruit in said arrested members, means for releasing said arrested members, means for removing said arrested members from said position of arrest, and means for removing the fruit from the holding members comprising an ejector driven by said carrier member.

12. In a cherry pitting machine, a rectilinearly reciprocative pitter head having a plurality of pitter blades thereon, means for driving said head in said path to cause said blades to traverse a pitting position, means continuously and uniformly driven at a fixed rate of speed for feeding cherries to said pitting position for removal of pits therefrom, means for arresting the cherries at the pitting position in the path of said pitting blades for a period sufficient to remove the pits therefrom, said feeding means comprising a plurality of rows of fruit holding pockets arranged for movement in parallel rows toward said pitter blades, a hopper disposed adjacent said feeding means, operators' trays adjacent each row of fruit holding pockets and communicating with said hopper, groups of said trays being disposed on each side of said feeding means and the trays of each group being arranged longitudinally of said feeding means, and means adjacent each tray for screening all but one row of pockets from the reach of an operator positioned at such tray.

13. In a fruit pitting machine, an elongated fruit carrier provided with rows of fruit holding pockets movable together, means adjacent said carrier for cooperating therewith to remove pits from fruit positioned in said pockets, a storage hopper disposed adjacent said carrier, operators' trays adjacent each row of fruit holding pockets and communicating with said hopper, groups of said trays being positioned on each side of said carrier and the trays of each group being arranged longitudinally of said carrier, and means adjacent each tray for screening all but one row of pockets from access thereto by an operator positioned at such tray.

14. In a fruit pitting machine; a linearly reciprocative pitting device for expelling pits from fruit stationarily held in the path of reciprocation of a portion of said pitting device; and means synchronized with said pitting device for repeatedly positioning fruit in the path of said pitting device for pitting thereby comprising a closed loop of interlinked carriage-like fruit-holding devices; sprocket like members supporting said loop one of which members drives the same unidirectionally, rollers forming wheels for said carriage-like devices and engageable by said sprockets for driving the loop, straight trackways disposed for supporting the wheels of said carriage-like devices, means providing lost motion between successive carriage devices at their interlinking pivots, and means for successively engaging successive carriage-like members for first increasing the speed of movement thereof just before and then releasing the carriage at pitting point.

15. In a fruit pitting machine, a pitting device movable through a fixed position intermittently; and a fruit carrying and holding device for positioning fruit in said fixed position for pitting by said pitting device; said carrying device including a plurality of interlinked carrier elements having lost motion interlinkage; means for pushing the carrier elements toward the pitting position in such manner as to compress the carrying device elements in that portion thereof on the approach side of the pitting position, and means acting on the carrying device adjacent the discharge side of the pitting position to accelerate the nearmost elements into the pitting position and there to release them for stoppage in such position.

16. A pitting machine as set forth in claim 15, said last named means being in the nature of a sprocket adapted to engage one carrier element to withdraw it from the pitting position and thereby pull the succeeding carrier element into the pitting position.

OTTO WILLIAM JOHNSON.